Patented Oct. 27, 1942

2,300,123

UNITED STATES PATENT OFFICE 2,300,123

PROCESS FOR THE CATALYTIC POLYMERIZATION OF OLEFINS

Emil Keunecke and Wilhelm Muench, Ludwigshafen-on-the-Rhine, Germany; vested in the Alien Property Custodian No Drawing. Application June 29, 1938, Serial No. 216,622. In Germany June 30, 1937

4 Claims. (Cl. 196—10)

The present invention relates to the catalytic polymerization of olefins.

It has already been proposed to polymerize olefins, in particular those which are gaseous at ordinary temperature and pressure in the presence of phosphoric acid or of calcined or grained mixtures of this acid with kieselguhr, fuller's earth and similar solid substances or of catalysts which have been prepared by impregnation of silica gel, active carbons, pumice stone and other porous substances with phosphoric acid. There are thus obtained liquid hydrocarbons which may be used in particular as high quality motor fuels because they have a high octane value. As catalysts for this reaction it has already been proposed to use mixtures of phosphoric acid with inorganic salts, which may also contain if desired an addition of pulverulent substances serving as carriers, such as kieselguhr. The pulpy mixtures, similarly to the mixtures aforementioned, are calcined before use and if desired brought into a suitable solid form, for example by granulation.

We have now found that for the said polymerization of olefins, in particular of gaseous olefins or gases containing the same, catalysts of high and long enduring activity are obtained by applying solutions of metal compounds, in particular inorganic salts in liquid acids of phosphorus, in particular in phosphoric acid, to shaped carriers, in particular grained carriers. The pieces or grains of carrier preferably have a size of not less than 2 millimeters diameter and not more than 15 millimeters smallest diameter because in the case of larger grains a complete activation of the wood carbon right through cannot be effected with certainty. Among phosphoric acids, the ortho- and pyrophosphoric acids or mixtures of the same are specially suitable. As inorganic salts which are soluble in phosphoric acids there may be used for example copper phosphate, silver phosphate, zinc pyrophosphate, thorium nitrate, cadmium phosphate and the like. Oxides and hydroxides may also be added to the acids; it is preferable to take care that the additions have dissolved in the phosphoric acid to give a clear solution before application to the carrier. Salts which are soluble with difficulty in the cold may be brought completely into solution by heating; in this case the application to the carrier is preferably effected while hot. The said metal compounds are used in relatively small amounts, as for example from about 0.5 to 10 per cent of the weight of the phosphoric acid. Their effect consists chiefly in a prolongation of the life of the catalysts (especially in the case of the phosphates, pyrophosphates or metaphosphates of aluminum, magnesium, barium and potassium) or in an increase in the yield of the desired products (as for example in the case of copper phosphate, thorium phosphate and nickel phosphate). It may therefore be advantageous to dissolve two or more metal compounds acting in different directions in the phosphoric acid at the same time and then to apply them to suitable carriers. Especially suitable carriers are wood carbons activated with steam and combustion gases and having a filling weight of less than 200 grams per liter of filling volume.

The polymerization with the said catalysts is carried out at about the same temperatures and pressures as in other cases; the temperatures lie between 50° and 300° C. and the pressures between 1 and 200 atmospheres depending on the composition of the gas (nature and concentration of the olefins). The polymerization products obtained are mainly liquid hydrocarbons boiling within the boiling range of benzines.

The following examples will further illustrate the nature of this invention but the invention is not restricted to these examples.

*Example 1*

Propylene is led at 200° C. under atmospheric pressure over a catalyst which has been obtained by impregnating 100 cubic centimeters of wood carbon granulated to a particle diameter of about 2 to 3 millimeters and activated and having a filling weight of 155 grams per liter with a solution of 0.76 gram (2 per cent by weight) of zinc pyrophosphate in 38.3 grams of 89 per cent orthophosphoric acid. Initially there are obtained 29.1 grams of crude polymerization product per hour per liter of catalyst. The period in days before the maximum daily yield falls to 75 per cent is 21 and before it falls to 50 per cent (50 per cent value time) is 37 days, which corresponds to a yield of 18.90 kilograms for each liter of catalyst during the 50 per cent value time.

Under the same conditions, a catalyst prepared in a corresponding manner but without the addition of zinc pyrophosphate yields 29.2 grams of crude polymerization product per hour per liter of catalyst, the 75 per cent value time being only 8 days and the 50 per cent value time 20 days, which corresponds on an average to half the life and at the same time half the total yield of 9.93 kilograms of crude polymerization product per liter of catalyst during the 50 per cent value time.

If another activated wood carbon having a filling weight of 171 grams per liter and a grain size of from 3 to 5 millimeters be used and it be impregnated with a solution of 2 per cent by weight of zinc pyrophosphate in 29.0 grams of 89 per cent orthophosphoric acid to 100 cubic centimeters (that is with a smaller amount of acid) there is obtained under the same conditions as in the first case a yield of 20.5 grams of crude polymerization product per hour per liter of catalyst with a 50 per cent value time of 77 days (that is 3½ times the period) with a total yield of 26.86 kilograms of crude polymerization product per liter of catalyst during the 50 per cent value period or of 57.54 kilograms per kilogram of catalyst during the 50 per cent value period.

*Example 2*

By adding 0.76 gram (2 per cent by weight) of copper phosphate to 38.3 grams of 89 per cent orthophosphoric acid and impregnating the active carbon used in the first two cases in Example 1 with this solution there may be obtained by treating propylene under otherwise identical conditions an increase in the yield from 29.2 to 43.5 grams of crude polymerization product per hour per liter of catalyst, i. e. an increase of 14.3 grams or 49 per cent.

*Example 3*

The treatment hereinafter described is an example of the simultaneous increase in the yield and prolongation of the period before which the catalyst tires by the addition of a salt thereto. After replacing the 2 per cent by weight of zinc pyrophosphate used in Example 1 by 2 per cent of iron phosphate in a catalyst prepared in the same way, there may be obtained under otherwise identical conditions with a maximum yield of 33.5 grams of crude polymerization product per hour per liter of catalyst and a 75 per cent value period of 23 days, a total yield of 15.83 kilograms per liter of catalyst during the 75 per cent value period. Compared with the values with the salt-free catalyst according to Example 1 (second case), this corresponds to an increase—

(a) In the best daily yield of 14.7 per cent by weight, (b) In the total yield in the 75 per cent value period from 4.98 kilograms to 15.83 kilograms or of 218 per cent and (c) In the 75 per cent value period from 8 to 23 days or of 187 per cent.

*Example 4*

By leading moist 99 per cent isobutylene gas at a speed of flow of 6 liters per hour under atmospheric pressure and at 200° C. over 100 cubic centimeters of a catalyst (prepared by impregnating the carbon employed in the first case in Example 1 with a solution of 0.76 gram of copper phosphate, i. e. 2 per cent by weight, in 38.3 grams of 89 per cent phosphoric acid) there are obtained, with a conversion of 88 per cent by weight of the isobutylene, at first 121 grams of crude polymerization product per hour per liter of catalyst. 22 days pass before the maximum daily yield falls to 75 per cent and this corresponds to a yield of 51.45 kilograms of crude polymerization product per liter of catalyst during the 75 per cent value time.

Without the addition of copper phosphate, the same catalyst yields under the same conditions a yield of 107.7 grams of crude polymerization product per hour per liter of catalyst with a 75 per cent value period of only 5 days, corresponding to an increase in yield of 12.3 per cent and a prolongation of the 75 per cent value period to 4½ times; compared with the yield of only 11.21 kilograms of crude polymerization product per liter of catalyst in the 75 per cent value period, the 51.45 kilograms obtained with the copper phosphate amount to an increase of 359 per cent by weight.

What we claim is:

1. A process for the polymerization of olefins into liquid hydrocarbons suitable as motor fuels which comprises contacting the said olefins at a reacting temperature with a catalyst comprising a solution of zinc pyrophosphate in phosphoric acid.

2. A process for the polymerization of olefins into liquid hydrocarbons suitable as motor fuels which comprises contacting the said olefins at a reacting temperature with a catalyst prepared by impregnating a porous, shaped carrier with a solution of zinc pyrophosphate in phosphoric acid.

3. A process for the polymerization of olefins into liquid hydrocarbons suitable as motor fuels which comprises contacting the said olefins at a reacting temperature with a catalyst prepared by impregnating an active wood charcoal with a solution of zinc pyrophosphate in phosphoric acid.

4. A process for the polymerization of olefins into liquid hydrocarbons suitable as motor fuels which comprises contacting the said olefins at a reacting temperature with a catalyst prepared by impregnating a carrier in the form of small pieces having a size of not less than 2 mm. diameter consisting of activated wood charcoal having a filling weight of less than 200 grams per liter of filling volume with a solution of zinc pyrophosphate in phosphoric acid.

EMIL KEUNECKE.
WILHELM MUENCH.